United States Patent
Maggiari et al.

(10) Patent No.: US 9,692,637 B2
(45) Date of Patent: Jun. 27, 2017

(54) FAULT PROTECTION METHOD AND FAULT PROTECTION APPARATUS IN A MULTI-DOMAIN NETWORK

(75) Inventors: Massimiliano Maggiari, Genoa (IT); Rosario Colica, Genoa (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 774 days.

(21) Appl. No.: 14/000,667

(22) PCT Filed: Feb. 22, 2011

(86) PCT No.: PCT/EP2011/052578
§ 371 (c)(1),
(2), (4) Date: Jan. 28, 2014

(87) PCT Pub. No.: WO2012/113444
PCT Pub. Date: Aug. 30, 2012

(65) Prior Publication Data
US 2014/0136908 A1 May 15, 2014

(51) Int. Cl.
*H04L 1/00* (2006.01)
*H04L 12/24* (2006.01)
(Continued)

(52) U.S. Cl.
CPC ........ *H04L 41/0672* (2013.01); *H04L 12/462* (2013.01); *H04L 41/0663* (2013.01);
(Continued)

(58) Field of Classification Search
CPC ... H04L 41/0672; H04L 12/462; H04L 45/04; H04L 45/22; H04L 52/28; H04L 45/245; H04L 45/28; Y02B 60/33
See application file for complete search history.

(56) References Cited

U.S. PATENT DOCUMENTS

| | | | |
|---|---|---|---|
| 2002/0131362 A1* | 9/2002 | Callon | G06F 11/2294 370/216 |
| 2007/0091793 A1* | 4/2007 | Filsfils | H04L 12/4633 370/228 |

(Continued)

FOREIGN PATENT DOCUMENTS

| | | |
|---|---|---|
| CN | 1798051 A | 7/2006 |
| CN | 1859156 A | 11/2006 |

(Continued)

OTHER PUBLICATIONS

Search Report issued on Aug. 25, 2015 in corresponding CN Application No. 201180070324.7, 2 pages.
(Continued)

*Primary Examiner* — Abdelnabi O Musa
(74) *Attorney, Agent, or Firm* — Rothwell, Figg, Ernst & Manbeck, p.c.

(57) ABSTRACT

The present invention relates to a fault protection method and a fault protection device for an inter-domain link of a multi-domain network. The invention may be particularly applied to multi-domain networks providing end to end services such as an Ethernet service. Embodiments of the invention use a link protection group for an inter-domain link. Link protection group information relating to the link protection group is used to identify a replacement inter-domain link for a faulty inter-domain link that is configured for an inter-domain service. Once the replacement link is identified, the routing of the inter-domain service may be re-configured from the network element ports of the faulty inter-domain link to the network element ports of the identified second inter-domain link.

19 Claims, 6 Drawing Sheets

(51) Int. Cl.
*H04L 12/46* (2006.01)
*H04L 12/715* (2013.01)
*H04L 12/707* (2013.01)
*H04L 12/709* (2013.01)
*H04L 12/703* (2013.01)

(52) U.S. Cl.
CPC .............. *H04L 45/04* (2013.01); *H04L 45/22* (2013.01); *H04L 45/245* (2013.01); *H04L 45/28* (2013.01); *Y02B 60/33* (2013.01)

(56) References Cited

U.S. PATENT DOCUMENTS

| | | | |
|---|---|---|---|
| 2007/0253326 A1* | 11/2007 | Saha | H04L 12/4641 370/217 |
| 2008/0031619 A1 | 2/2008 | Xu et al. | |
| 2008/0198741 A1* | 8/2008 | Lichtwald | H04L 45/04 370/228 |
| 2009/0252030 A1* | 10/2009 | Kashyap | H04L 12/437 370/216 |
| 2009/0303883 A1* | 12/2009 | Kucharczyk | H04L 12/4645 370/241 |
| 2012/0082026 A1* | 4/2012 | Ryoo | H04L 45/28 370/220 |

FOREIGN PATENT DOCUMENTS

| | | |
|---|---|---|
| EP | 2028768 A1 | 2/2009 |
| WO | 2004077759 A1 | 9/2004 |
| WO | 2009155996 A1 | 12/2009 |
| WO | 2011/003459 A1 | 1/2011 |

OTHER PUBLICATIONS

Office Action issued in corresponding Chinese patent application No. 201180070324.7 dated Apr. 20, 2016, along with English translation, 11 pages.

* cited by examiner

FAULT PROTECTION METHOD AND FAULT PROTECTION APPARATUS IN A MULTI-DOMAIN NETWORK

CROSS-REFERENCE TO RELATED APPLICATION

This application is a 35 U.S.C. §371 National Phase Entry Application from PCT/EP2011/052578, filed Feb. 22, 2011, and designating the United States.

TECHNICAL FIELD

The present invention relates to a fault protection method and a fault protection apparatus for an inter-domain link in a multi-domain network. The invention may be particularly applied to multi-domain networks providing end to end inter-domain services such as an Ethernet service.

BACKGROUND

Increasingly network arrangements are formed from a number of interconnected network regions or domains. The different domains may use different technologies for transport of the service traffic, and may use different technologies to provide fault protection for service traffic in the domain.

In one example of such a situation, carrier Ethernet networks are increasingly being used to provide a switched transport infrastructure based on Provider Bridge and Provider Backbone Bridge technology.

A Provider Bridge network is provided with a loop prevention protocol, such as Rapid Spanning Tree Protocol RSTP, multiple Spanning Tree Protocol MSTP and Ethernet Ring Protection ERP, that also acts as a protection scheme in the network itself. A region in which the routing algorithms and loop prevention packets can be segregated and within which Bridge Protocol Data Units (BPDU) of the loop prevention protocols are propagated is called a domain.

Provider bridge networks protect service traffic from network faults within a domain through distributed loop prevention protocols that calculates a loop free routing topology able to carry the service traffic along a route from the source to the destination of the configured service in response to network faults.

In order to achieve this responsiveness to network faults within a domain, the traffic for a service tagged with the relevant Virtual Local Area Network VLAN tags for the service must be configured on all the network element ports that can be involved in any of the possible packet routes that the loop prevention protocols can calculate.

In the multi-domain network arrangements described above, the loop prevention protocols do not operate between the domains. As a result it is necessary for an inter-domain link to be selected exclusively to carry the service traffic from one domain to another. A failure on this link cannot be protected against.

The present invention seeks to alleviate or ameliorate at least some of the disadvantages of the prior art, and to provide a novel fault protection method and a fault protection apparatus for an inter-domain link of a multi-domain network.

SUMMARY

According to one aspect of the invention there is provided fault protection method for an inter-domain link between network element ports in different domains of a multi-domain network. The method uses link protection group information relating to at least a first link protection group, comprising a first inter-domain link between respective network element ports configured for an inter-domain service and a second inter-domain link between respective network element ports. In a first step, a fault is determined in the first inter-domain link. In a second step, the second inter-domain link is identified from the link protection group information. In a third step routing of the inter-domain service is re-configured from the respective network element ports of the first inter-domain link to the respective network element ports of the identified second inter-domain link.

According to a second aspect of the invention there is provided a machine-readable medium comprising instructions which cause a processor to perform a method of fault protection for an inter-domain link between network element ports in different domains of a multi-domain network in accordance with the invention.

In accordance with a third aspect of the invention there is provided an apparatus providing fault protection for inter-domain links between network element ports in different domains of a multi-domain network. The apparatus comprises a store for storing link protection group information relating to at least a first link protection group comprising a first inter-domain link between respective network element ports configured for an inter-domain service and a second inter-domain link between respective network element ports. The apparatus also comprises a fault manager, coupled to receive fault reports and operable to determine a fault in the first inter-domain link. The apparatus also comprises a restoration manager, coupled to the fault manager to receive a notification of a fault for the first inter-domain link and coupled to the store to access the link protection group information associated with the first inter-domain link, the restoration manager being operable to identify a second inter-domain link from the link protection group information. The apparatus also comprises a service configuration manager coupled to the restoration manager to receive notification of an inter-domain service routing configuration change and operable to reconfigure routing of the inter-domain service from the respective network element ports of the first inter-domain link to the respective network element ports of the identified second inter-domain link.

BRIEF DESCRIPTION OF THE DRAWINGS

The invention will now be described by way of example with reference to the accompanying drawings.

DETAILED DESCRIPTION

Figure 1:
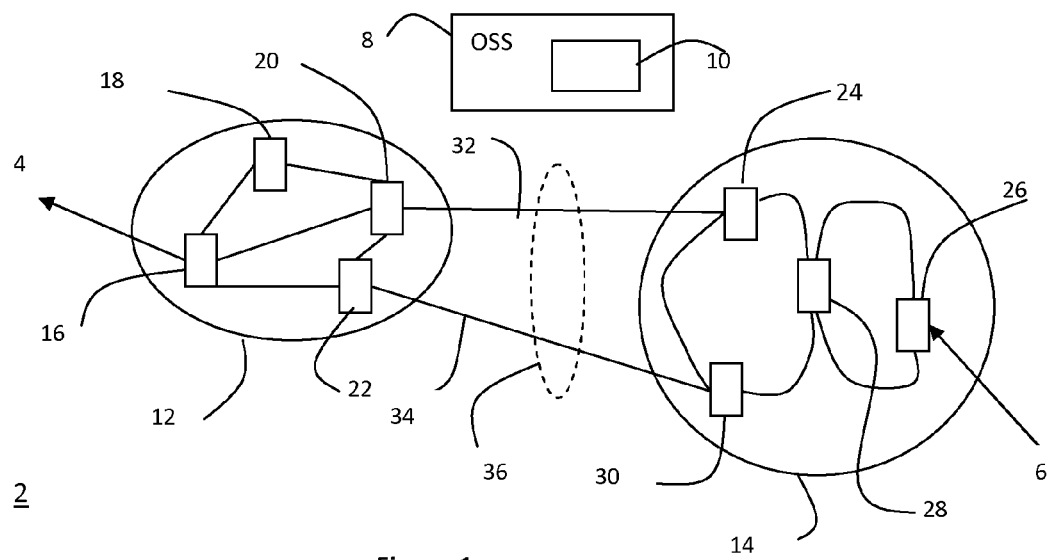
FIG. 1 is a schematic diagram showing one exemplary network arrangement in which the invention may be implemented

FIG. 1 is a schematic diagram showing one exemplary network arrangement in which embodiments of the invention may be implemented.

FIG. 1 shows a network arrangement 2 able to provide inter-domain services, for example communication services, across the network arrangement 2. In the exemplary embodiment shown in FIG. 1, the inter-domain service is an inter-domain Ethernet service provided between a service access point 4 and a service access point 6 and the service access point 4 and service access point 6 act as the Ethernet service end points.

An Operation System Support (OSS) 8 is provided for managing the operation of Ethernet services in the network arrangement 2. In particular the operation system support (OSS) 8 is responsible for determining the routing of the communication service, in the exemplary embodiment the Ethernet service, across the network arrangement 2. The operation system support (OSS) 8 is provided with an OSS store 10. In some embodiments the OSS store 10 may be implemented as a database.

The network arrangement 2 has a first domain 12 and a second domain 14. In the exemplary embodiment shown in FIG. 1, a loop avoidance protocol is implemented in each of the first domain 12 and the second domain 14. However, no loop avoidance protocol is implemented between the first domain 12 and the second domain 14.

The first domain 12 is structured as a spanning tree and has a plurality of network elements 16, 18, 20, 22 within it. The second domain 14 is structured as an Ethernet ring and also has a plurality of network elements 24, 26, 28, 30 within it. A first inter-domain link 32 is provided between network element 20 of first domain 12 and network element 24 of second domain 14. A second inter-domain link 34 is provided between network element 22 of first domain 12 and network element 30 of the second domain 14.

Each network element is provided with at least one network port (not shown in FIG. 1 for clarity) enabling communication with another network element over a network link. As will be known by a skilled person, in the exemplary embodiment in which an Ethernet service is configured in the network arrangement 38 network ports in each domain are configured with the virtual local area network identification (VLAN ID) for the Ethernet service.

Figure 2:
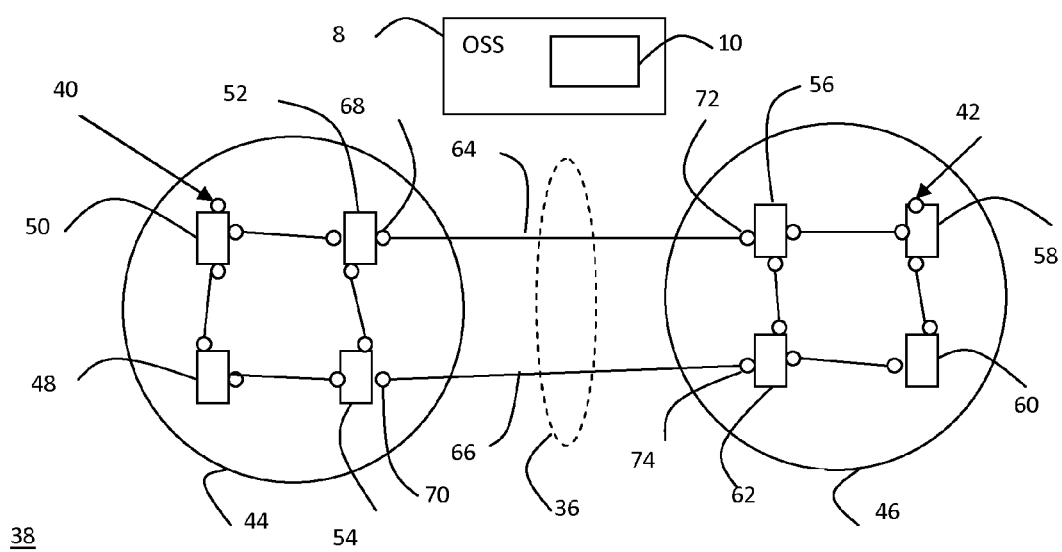
FIG. 2 is a schematic diagram showing a second exemplary network arrangement in which the invention may be implemented

In embodiments of the invention a link protection group 36, shown schematically in FIG. 1, is applied to the inter-domain links 32 and 34 to provide inter-domain link fault protection as will become clear from a consideration of the following description. FIG. 2 is a schematic diagram showing in slightly more detail a second exemplary network arrangement in which the invention may be implemented.

FIG. 2 shows a further exemplary network arrangement 38 able to provide inter-domain services, for example communication services, across the network arrangement 38. In the exemplary embodiment the inter-domain service is an inter-domain Ethernet service provided between a service access point 40 and a service access point 42 and the service access point 40 and service access point 42 act as the Ethernet service end points.

An Operation System Support (OSS) 8 is provided for managing the operation of Ethernet services in the network arrangement 38. In particular the operation system support (OSS) 8 is responsible for determining the routing of the inter-domain service, in the exemplary embodiment the inter-domain Ethernet service, across the network arrangement 38. The operation system support (OSS) 8 is provided with an OSS store 10. In some embodiments the OSS store 10 may be implemented as a database, and the OSS store will generally be referred to as OSS database 10 in the following description.

The network arrangement 38 has a first domain 44 and a second domain 46, which in the exemplary embodiment shown in FIG. 2 are Multi-Protocol Switching Labels transport profile (MPLS-TP) network domains. A skilled person will understand that other embodiments may be implemented in any kind of domain, including those implemented in FIG. 1. In the exemplary embodiment, a loop avoidance protocol is implemented in each of the first domain 44 and the second domain 46. However, no loop avoidance protocol is implemented between the first domain 44 and the second domain 46.

The first domain 44 has a plurality of network elements 48, 50, 52, 54 within it, and the second domain 46 also has a plurality of network elements 56, 58, 60, 62 within it. A first inter-domain link 64 is provided between network element 52 of first domain 44 and network element 56 of second domain 46. A second inter-domain link 66 is provided between network element 54 of first domain 44 and network element 62 of the second domain 46. Each of the network elements 48-62 is provided with at least one network port enabling communication with another network element over a network link, denoted in FIG. 2 as a circular element on the respective network element 48-62. For clarity, only network port 68 of network element 52; network port 70 of network element 54; network port 72 of network element 56; and network port 74 of network element 62 are identified specifically in FIG. 2.

As will be known by a skilled person, in the exemplary embodiment in which an Ethernet service is configured in the network arrangement 38, network ports in each domain are configured with the virtual local area network identification (VLAN ID) for the Ethernet service.

In embodiments of the invention a link protection group 36 applied to inter-domain links 64 and 66 to provide inter-domain link fault protection is shown schematically in FIG. 2.

As will become clear later, in the link protection group 36 one of the first inter-domain link 64 and the second inter-domain link 66 will be used to carry the service traffic as the primary traffic inter-domain link, and the other of the first inter-domain link 64 and the second inter-domain link 66 will be a secondary or replacement inter-domain link to carry the service traffic if the primary traffic inter-domain link cannot carry the communications traffic.

As will be explained in more detail hereafter, in the exemplary embodiment in which the communication service is an inter-domain Ethernet service, the operation system support (OSS) 8 applies a virtual local area network identification (VLAN ID) of the inter-domain Ethernet service to network ports at the network elements at each end of a primary traffic link of the link protection group carrying the communication traffic. If a fault develops with the primary traffic link of the link protection group, the operation system support (OSS) 8 removes the virtual local area network identification (VLAN ID) of the inter-domain Ethernet service from network ports at the network elements at each end of the primary traffic link and applies the virtual local area network identification (VLAN ID) to network ports at the network elements at each end of the secondary replacement inter-domain link of the link protection group carrying the communication traffic.

The function and operation of the exemplary link protection group 36 in a network arrangement 38 as shown in FIG. 2 will now be explained with reference to FIGS. 3-7. However, it will be understood by a skilled person that the principles of function and operation described below may also be applied to the link protection group 36 described above with reference to network arrangement 2 shown in FIG. 1 and in other network arrangements in other embodiments. In particular, a skilled person will appreciate that the invention is applicable to many possible multi-domain service topologies, including situations where Multi-Protocol Switching Labels transport profile (MPLS-TP) network domains are inter-connected with Multiple Spanning Tree Protocol (MSTP) network and Ethernet Ring Protection (ERP) network regions. The link protection group can also be applied to networks where provider bridge clouds inter-work with a Multi-Protocol Switching Labels transport profile (MPLS-TP) core network.

In the description of FIGS. 3-7 it is assumed that a link protection group 36 is in existence and is operating to provide fault protection for an inter-domain link. The setting up and initiation of a link protection group 36 will be described later in connection with FIGS. 8 and 9.

A link protection group 36 in accordance with embodiments is formed and operated by fault protection elements in the operation system support OSS 8. In particular it should be noted that the link protection group (LPG) is configured only on the OSS database 10 and no configuration of the network elements or network ports is required for configuration of the link protection group (LPG).

The link protection group (LPG) 36 is used to re-configure the traffic routing for a communication service when a fault affecting an inter-domain link used for traffic routing of the communication service is detected. In an Ethernet service, this may be achieved by reconfiguring the Ethernet service virtual local area network identifier (VLAN ID).

The link protection group (LPG) is formed and managed by the operation system support (OSS) function in the network arrangement. In the link protection group (LPG) managed by the operation system support (OSS) an association is made between two inter domain links, such as the first inter-domain link 64 and the second inter-domain link 66 as shown in FIG. 1. This association between the links provides the link protection group (LPG).

When a communication service, such as an Ethernet service, is set up using one of the links in a link protection group (LPG) 36, that link is the primary traffic-carrying link of the link protection group (LPG) 36. When a fault occurs in the primary link of the link protection group (LPG) 36, the other inter-domain link in the link protection group can be configured to carry the communication service traffic instead, thus providing fault protection for the primary inter-domain link. When the communications service is an Ethernet service, the reconfiguring of the links may be achieved by moving the related VLAN ID configuration from the ports of the primary Link Protection Group (LPG) link to the ports of the secondary Link Protection Group (LPG) link.

Link protection group information 78 relating to the association between the links making up the link protection group is stored and used in a fault handling method using the link protection group. In some embodiments the link protection group is implemented using managed objects in the OSS database 10, and these managed objects form the link protection group information 78. In these embodiments the operation system support 8 creates and manages the different managed objects in the operation system support database 10 to implement and use the link protection group (LPG).

It will be appreciated that a link protection group (LPG) comprises two inter-domain links. Furthermore, each inter-domain link is formed between two end ports each on a respective network element in different domains. A logical model of the link protection group includes a managed object for each of the different elements involved in the link protection group, namely the link protection group (LPG) itself; each of the links within the link protection group and each of the two ports for each of the links within the link protection group.

Thus in the exemplary embodiment shown in FIG. 2 inter-domain links 64 and 66 form the link protection group 36. The inter-domain link 64 is formed between network element port 68 on network element 52 in domain 44 and network element port 72 on network element 56 in domain 46. Similarly, the inter-domain link 66 is formed between network element port 70 on network element 54 in domain 44 and network element port 74 on network element 62 in domain 46.

The link protection group information 78 comprises managed objects for the different elements of the exemplary link protection group shown in FIG. 1, namely:
 managed object LPG1 80 for the link protection group 36;
 managed object L1 82 for the inter-domain link 64;
 managed object L1P1 84 for the network element port 68;
 managed object L1P2 86 for the network element port 72;
 managed object L2 88 for the inter-domain link 66;
 managed object L2P1 90 for network element port 70; and
 managed object L2P2 92 for network element port 74.

Figure 3:
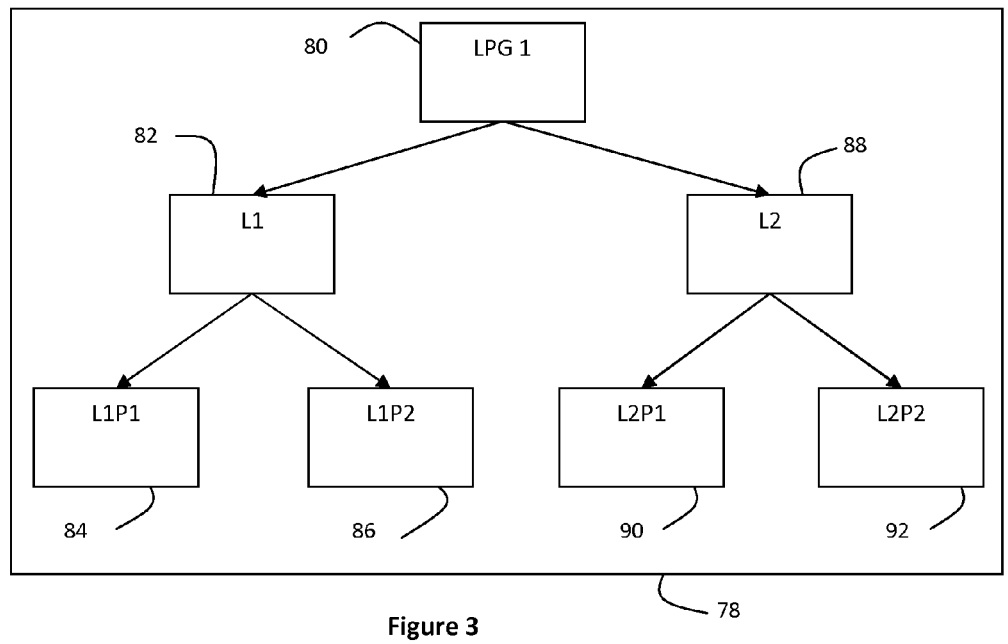
FIG. 3 is a schematic diagram showing the logical relationship between link protection group entities

The managed objects are related to each other as shown in FIG. 3, which shows the logical relationship model of managed objects for the link protection group (LPG) 36.

Figure 4:
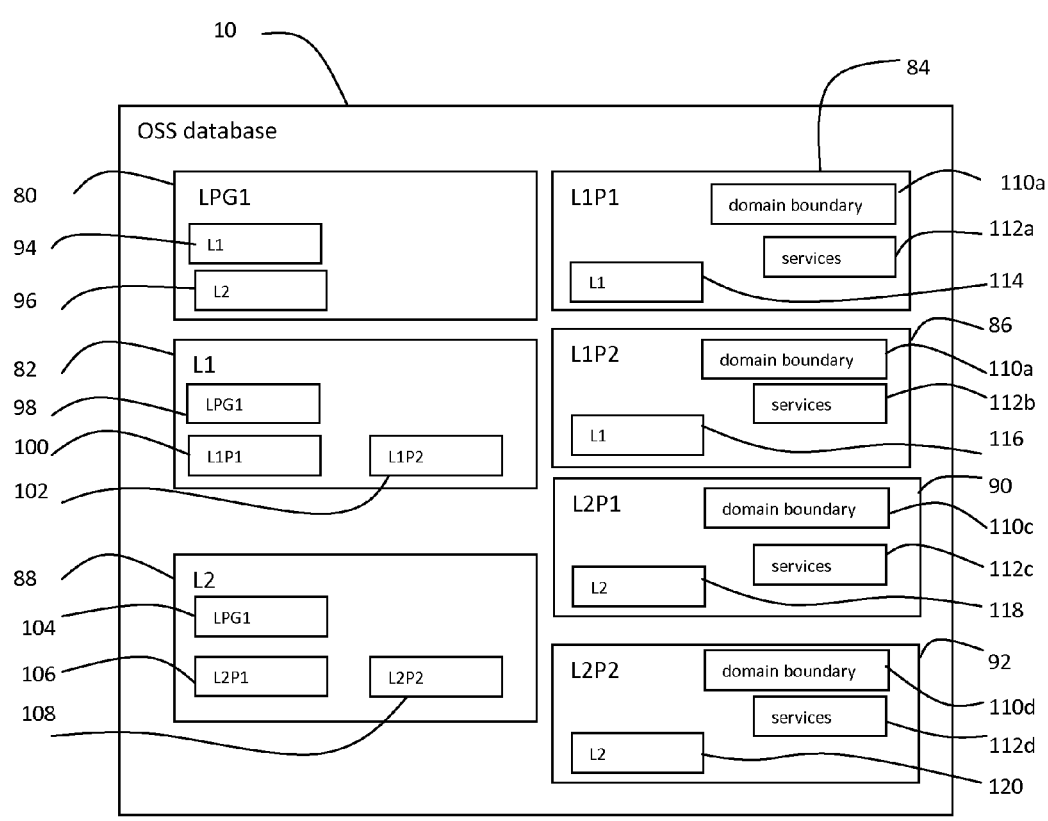
FIG. 4 is a schematic diagram of stored link protection group entities.

FIG. 4 shows an exemplary arrangement of the managed objects stored within the OSS storage 10. As mentioned in the preceding description, in the exemplary embodiment, the OSS storage 10 is a database such as a relational database, and the managed objects are stored as managed objects within the database 10. In such a database, associations between the different managed objects reflect the logical associations between the corresponding respective parts of the link protection group. The information stored in each of the managed object types will be discussed below. It will be appreciated by a skilled person that in some implementations other information or associations not described below may also be stored in or associated with the managed objects. In addition, the manner in which the information is stored, or an association made between managed objects may vary in different implementations as selected by a skilled person.

A link protection group managed object is associated with each of the links making up the link protection group.

In the exemplary embodiment shown with reference to FIG. 4, the link protection group managed object LPG1 80 stores an association 94 with the first link managed object L1 82 and an association 96 with the second link managed object L2 88.

A link managed object is associated with the corresponding link protection group managed object, and is also associated with the port managed objects of network element ports at each end of the link.

In the exemplary embodiment shown with reference to FIG. 4, the first link managed object L1 82 stores an association 98 with the link protection group managed object LPG1 80; an association 100 with the managed object L1P1 84 for the network element port 68; and an association 102 with the managed object L1P2 86 for the network element port 72.

In the exemplary embodiment shown with reference to FIG. 4, the second link managed object L2 88 stores an association 104 with the link protection group managed object LPG1 80; an association 106 with the managed object L2P1 90 for network element port 70 and an association 108 with the managed object L2P2 92 for network element port 74.

A port managed object is associated with the corresponding link managed object. In addition, the port managed object is associated with other information relating to the port, not all of which is shown in FIG. 4 for clarity. In particular, a port managed object may include a service association indicating services configured on the network element port. In some embodiments, this may be achieved by associating the port managed object with a service managed object for a service. In addition, in some embodiments information relating to whether a network element port is at a domain boundary is stored in or associated with the respective port managed object.

In the exemplary embodiment shown in FIG. 4, the port managed object L1P1 84 for the network element port 68 stores domain boundary information 110a; an association 112a with services configured on the network element port 68; and an association 114 with the first link managed object L1 82.

In the exemplary embodiment shown in FIG. 4, the port managed object L1P2 86 for the network element port 72 stores domain boundary information 110b; an association 112b with services configured on the network element port 72; and an association 116 with the first link managed object L1 82.

In the exemplary embodiment shown in FIG. 4, the port managed object L2P1 90 for the network element port 70 stores domain boundary information 110c; an association 112c with services configured on the network element port 70; and an association 118 with the second link managed object L2 88.

In the exemplary embodiment shown in FIG. 4, the port managed object L2P2 92 for the network element port 72 stores domain boundary information 110d; an association 112d with services configured on the network element port 72; and an association 120 with the second link managed object L2 88.

In this connection it is noted that in addition to being stored in the OSS database 10, the port managed objects are also stored in network element storage of the network element associated with the port, as will be understood by a skilled person.

Figure 5:
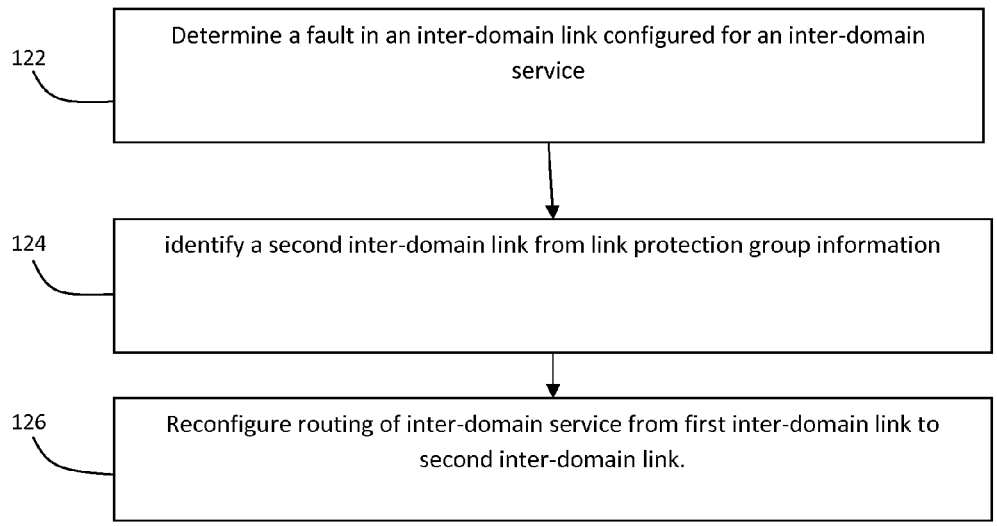
FIG. 5 is a flow chart showing a method of fault protection in accordance with embodiments of the invention

The use of the link protection group in accordance with embodiments to provide fault protection for an inter-domain link will now be described with reference to FIGS. 5 and 6.

As mentioned before, in this exemplary method it is assumed that a link protection group in accordance with the exemplary embodiment has been set up and that an inter-domain Ethernet service is operating over one of the links of the link protection group.

In a first step 122 a link configured for an inter-domain service is monitored to determine the existence of a fault in the inter-domain link. This may be carried out in different ways in different implementations of the invention, as will be discussed in more detail with reference to FIGS. 6 and 7.

In a second step 124, in response to the detection of a fault in the inter-domain link, a second inter-domain link is determined from link protection group information 78 relating to a link protection group operating in respect of the faulty inter-domain link. This may be carried out in different ways in different implementations of the invention, as will be discussed in more detail with reference to FIGS. 6 and 7.

In a third step 126, the routing of the inter-domain service from the first inter-domain link to the second inter-domain link is reconfigured. Again, this may be carried out in different ways in different implementations of the invention, as will be discussed in more detail with reference to FIGS. 6 and 7.

Figure 6:
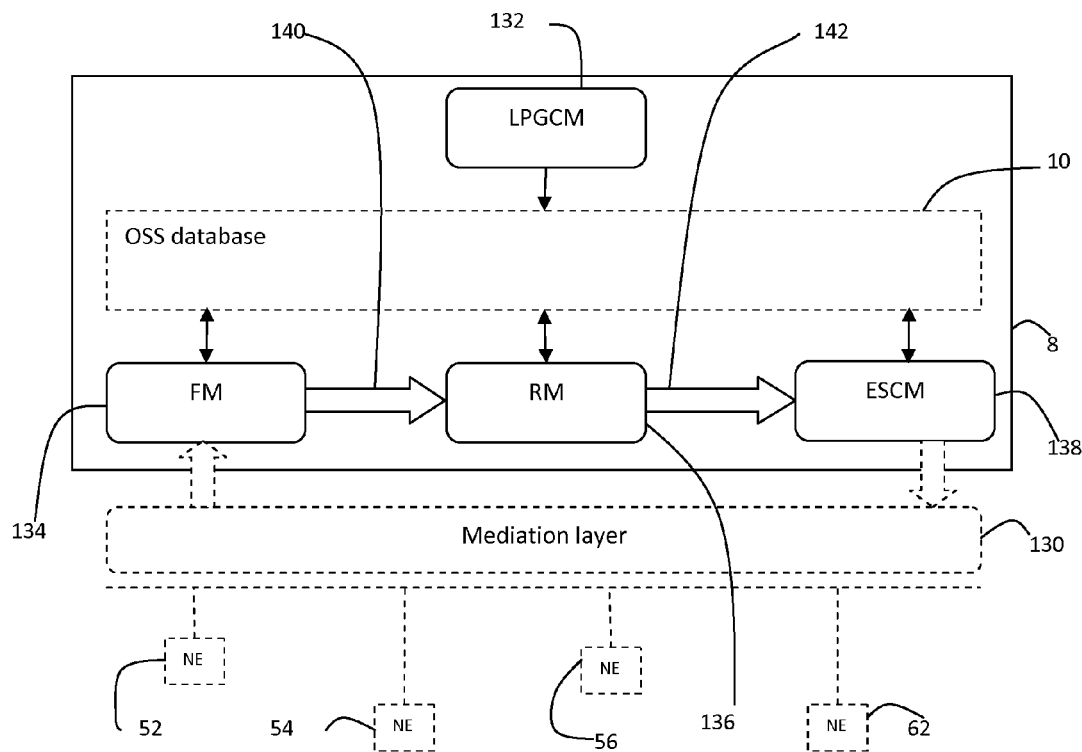
FIG. 6 is a diagram showing the operation system support architecture in an exemplary embodiment.

An exemplary implementation of an embodiment in the operation system support OSS 8 is shown in FIG. 6. Elements of the operation system support OSS 8 not relevant to a discussion of embodiments of the invention have been omitted for simplicity.

The operation support system OSS storage 10 is shown as part of the operation system support (OSS) 8 in the exemplary embodiment. However, as will be appreciated by a skilled person, the OSS storage 10 may be implemented separately, and the OSS modules access the separate OSS storage 10, as will be described in the following description.

In the exemplary embodiment the OSS storage 10 is implemented as a database, as discussed with reference to FIG. 4. However, the use of a database is not essential and OSS storage 10 may be implemented in other ways in different embodiments as will be known by a skilled person.

The operation system support (OSS) 8 is able to communicate with a plurality of network elements NE via a mediation layer 130. In particular the operation system support (OSS) 8 is able to receive information relating to link status from the network elements in order to monitor link status, and is also able to communicate VLAN IDs to the network elements to configure the inter-domain Ethernet service. The required mediation layer functionality will be understood by a skilled person and therefore will not be described in detail.

For the sake of clarity, only four exemplary network elements are shown as being monitored by the operation system support (OSS) 8, namely the network elements 52, 54, 56, and 62. However, the skilled person will appreciate that other network elements will also be monitored in a practical implementation of an embodiment of the invention.

The operation system support (OSS) 8 of the exemplary embodiment shown in FIG. 6 is provided with a plurality of functional modules. In particular the operation system support (OSS) 8 is provided with:
 a link protection group configuration manager 132;
 a fault manager 134;
 a restoration manager 136; and
 an Ethernet service configuration manager 138.

The link protection group configuration manager 132, the fault manager 134, the restoration manager 136, and the Ethernet service configuration manager 138 may be arranged in many different ways in different embodiments, and the described functionalities of the different elements may be combined in a fewer or divided into a greater number of modules. In some embodiments, the operation system support (OSS) 8 may be implemented as a computer program running on a suitable processor, and the different managers may be implemented as modules of the computer program.

The link protection group configuration manager 132, the fault manager 134, the restoration manager 136, and the Ethernet service configuration manager 138 are all coupled to the operation system support database 10 and are able either to create or to interact with managed objects in the operation system support (OSS) database 10. The interactions with the managed objects made by each of the managers will be described in more detail below with reference to the specific manager.

The link protection group configuration manager (LPGCM) 132 of the operation system support 8 is arranged to access the OSS database 10 and is responsible for creating the managed objects relating to a link protection group in the OSS database 10. The steps involved in the creation and configuration in the OSS database 8 of managed objects for a link protection group in an exemplary embodiment will be explained in more detail with reference to FIG. 8.

In particular, during the creation and configuration of the link protection group described above in connection with FIGS. 3 and 4, the link protection group configuration manager (LPGCM) 132 creates the link protection group (LPG) managed object LPG1 80, and creates the necessary associations between the link protection group (LPG) managed object, the link managed objects and the network element port managed objects, for example as set out above with reference to FIGS. 3 and 4. Generally, it is expected that the port managed objects will be already stored in the OSS database, and the link managed objects may also be stored in the OSS database. If necessary the link protection group configuration manager (LPGCM) 132 creates the port managed objects and the link managed objects required for the link protection group.

It should be noted that the link protection group managed object LPG1 80 and the link managed object L1 82 and link managed object L2 88 are created and configured only in the OSS database 10 and no configuration of the relevant network elements is required.

In the following description it is assumed that all the necessary managed objects for a link protection group LPG covering an inter-domain link are set up in the OSS database 10.

The fault manager 134 of the operation system support 8 is coupled to network elements 52, 54, 56, 62 through the mediation layer 130 to receive fault information. In addition, the fault manager (FM) 134 is also arranged to access managed objects in the OSS database 10. In the exemplary embodiment, the fault manager FM 134 is operable to listen for network elements alarms and accesses the OSS database 10 to identify a faulty inter-domain link that is configured for an inter-domain service, as will be explained in more detail in connection with FIG. 7. The fault manager (FM) is arranged to supply a notification 140 of the faulty inter-domain link to the restoration manager (RM).

Figure 7:
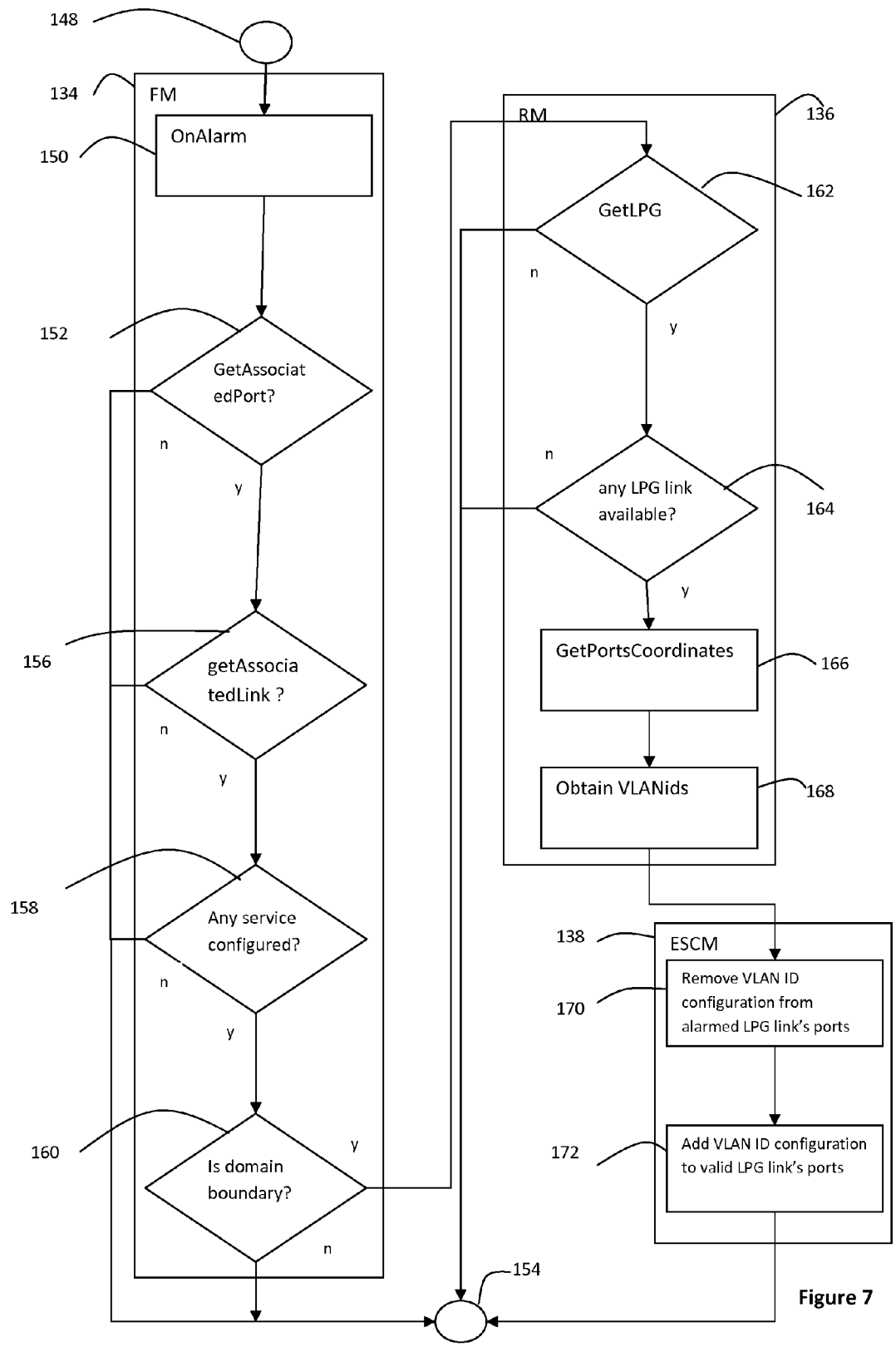
FIG. 7 is a flowchart showing a detailed method of operation of the operation system support architecture in the exemplary embodiment shown in FIG. 6.
Figure 8:
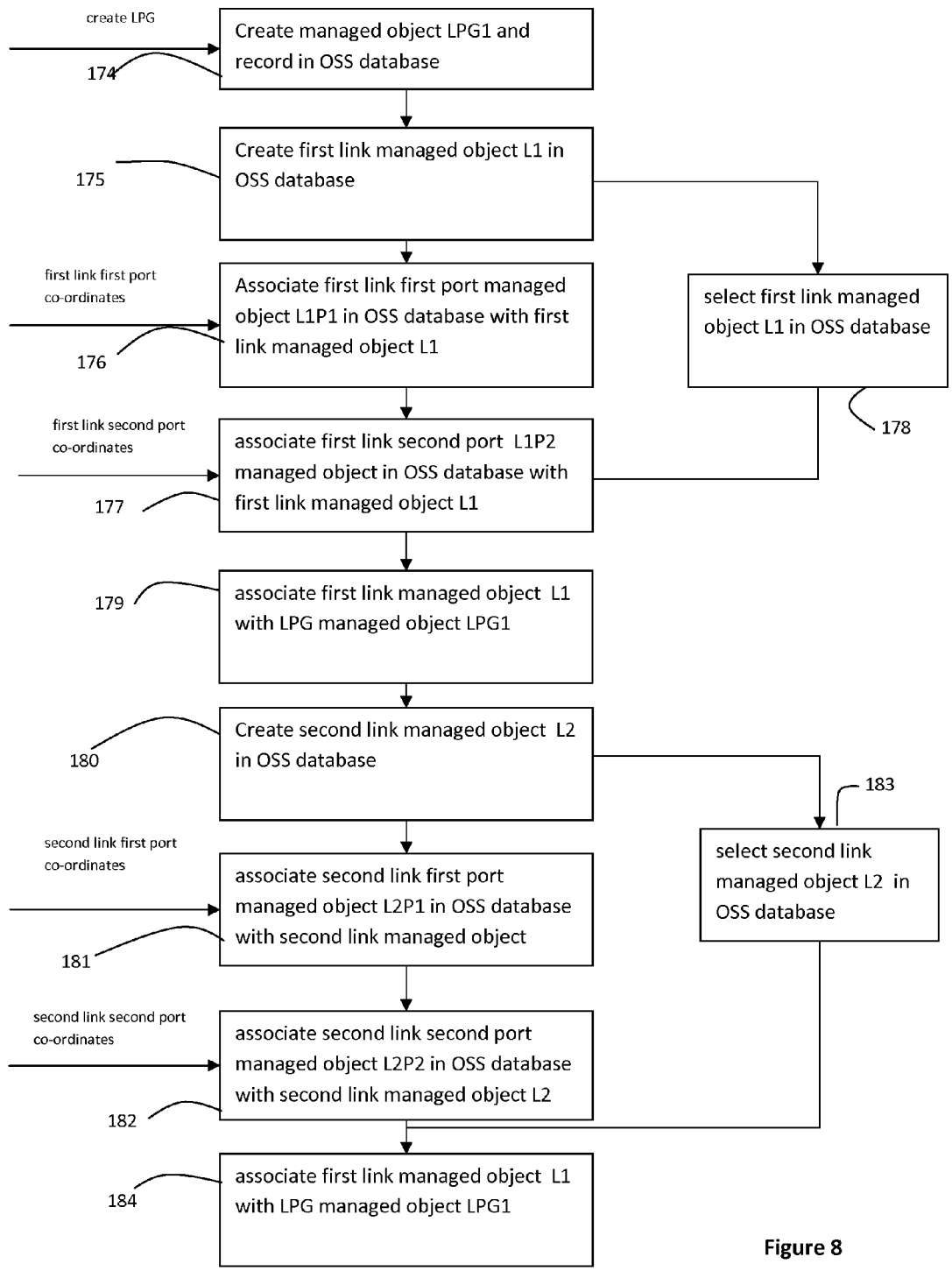
FIG. 8 is a flowchart showing a method of configuring a link protection group in accordance with an exemplary embodiment.

The restoration manager (RM) 136 of the operation system support 8 is arranged to receive a notification 140 of a faulty inter-domain link from the fault manager (FM), and is arranged to access the OSS database 10 in order to identify whether the faulty inter-domain link may be restored by the link protection group, as will be explained in more detail in connection with FIG. 7. If the Ethernet service traffic can be restored using a link protection group, the restoration manager (RM) 136 is arranged to instruct the re-configuration of the Ethernet service by the Ethernet Service configuration manager. This may be achieved in the exemplary embodiment for example by applying the relevant VLAN ID configuration to the ports of the replacement link identified in the link protection group.

The Ethernet service configuration manager (ESCM) 138 of the operation system support 8 is arranged to receive from the restoration manager (RM) 136 an instruction 142 to restore a faulty inter-domain link using the replacement link specified in the link protection group. The Ethernet service configuration manager (ESCM) 138 accesses the managed objects in the OSS database 10 to identify the ports where the VLAN ID configuration is to be changed, and to update the VLAN ID configuration on the updated port managed objects in the OSS database 10. In addition, the Ethernet service configuration manager (ESCM) 138 may ensure that the VLAN ID configuration is updated at the respective network element port through some mediation blocks not specified here.

A fault handling method providing Ethernet service dynamic reconfiguration at fault detection implemented in the exemplary embodiment of the operation system support (OSS) 8 according to FIG. 6 will now be explained with reference to FIG. 7.

In the following description at a starting stage 148 it is assumed that an Ethernet service has been created, routed and activated across different domains, for example in the network arrangement 38 shown in FIG. 1. A link protection group (LPG) is configured for the inter-domain link and the link protection group managed objects in accordance with the exemplary embodiment described above in connection with FIGS. 3 and 4 have been created and configured in the OSS database 10.

In a first step 150, the fault manager (FM) 134 receives an alarm notification for a fault affecting traffic on a specific network element port from the respective network element through the mediation layer 130. In the exemplary embodiments, we shall assume that the alarm notification relates to network element port 68 of the first inter-domain link 64.

In a second step 152, in response to the received alarm notification, the fault manager (FM) 134 accesses the OSS database 10 to find the port managed object for the specific network element port. If the port managed object for the specific port cannot be found in the OSS database 10 then the fault handling method exits to fault handling end stage 154 in step 152-*n*.

In the exemplary embodiment, the network element port managed object L1P1 84 for the network element port 68 of the first inter-domain link 64 is found in the OSS database 10. If the port managed object for the specific port can be found, step 152-*y*, then in step 156 the fault manager (FM) 134 accesses the OSS database 10 to access the link managed object associated with the specific port managed object. If the link managed object cannot be found in the OSS database 10 then the fault handling method exits to fault handling end stage 154 in step 156-*n*.

In the exemplary embodiment, the link managed object L1 82 for the inter-domain link 64 identified from link association 114 in network element port managed object L1P1 84 is found in the OSS database 10. If the link managed object can be found, step 156-*y*, then in step 158 the fault manager (FM) 134 determines whether Ethernet services are configured on the link. This may be done, for example, by using the services association 112*a* of network element port managed object L1P1 84 found in the OSS database 10 in the exemplary embodiment shown in FIGS. 3 and 4.

If no Ethernet services are configured, step 158-*n*, then the fault handling method exits to fault handling end stage 154.

If Ethernet services are configured, step 158-y, in step 160 the fault manager (FM) 134 will determine whether the link is an inter-domain connection involving a domain boundary port.

In the exemplary embodiment, this may be done by accessing the domain boundary information 110a of port managed object L1P1 84.

If the link is not an inter-domain link, step 160-n, then the fault handling method exits to fault handling end stage 154.

However, if the link is an inter-domain link, step 160-y, the fault handling method operation passes to the restoration manager (RM) 136 to check for link protection group (LPG) configuration on the faulty inter-domain link.

In some embodiments, a message 140 may be sent from the fault manager (FM) 134 to the Restoration manager (RM) 136 in response to which the restoration manager (RM) 136 determines whether a link protection group (LPG) is configured for the faulty inter-domain link. In other embodiments, the necessary transition from the fault manager (FM) 134 to the restoration manager (RM) 136 may be achieved without the use of an explicit message.

For example in embodiments where the restoration manager (RM) 136 and the fault manager (FM) 134 are implemented as modules of a software program, the necessary transition from the fault manager (FM) 134 to the restoration manager (RM) 136 may be achieved by the interaction between the different software modules without the use of an explicit message.

Once fault handling method operation has passed to the restoration manager (RM) 136, in step 162 the restoration manager (RM) 136 determines whether there is a link protection group (LPG) configured on the link affected by the fault by determining whether a corresponding link protection group (LPG) managed object is stored in the OSS database 10.

Thus in the exemplary embodiment, the restoration manager (RM) 136 determines from the link managed object L1 82 for the first inter-domain link 64 the association 98 with the link protection group managed object 80, and accesses the link protection group managed object 80.

If no link protection group (LPG) managed object is found, step 162-n, a link protection group (LPG) is not configured for the faulty link and so the fault handling method exits to fault handling end stage 154.

If the link protection group (LPG) managed object is found, step 162-y, the restoration manager (RM) 136 accesses the link protection group (LPG) managed object from the OSS database and in step 164 the restoration manager (RM) 136 checks whether the link protection group specifies an available replacement link to restore the traffic.

In the exemplary embodiment the restoration manager (RM) 136 accesses the link protection group (LPG) managed object 80 from the OSS database 10 and in step 164 the restoration manager (RM) 136 determines that the link protection group managed object LPG1 80 is also associated with the second inter-domain link managed object L2 88.

If no replacement link is available, step 164-n, then the fault handling method exits to fault handling end stage 154.

If, however, a replacement link is available in the link replacement group (LPG), step 164-y, the restoration manager (RM) 136 identifies the network element ports associated with the identified replacement link that can be used to restore the traffic in step 166.

Thus in the exemplary embodiment, in step 164 the restoration manager (RM) 136 accesses the second inter-domain link managed object L2 88 and uses associations 106 and 108 to identify the port managed objects L2P1 90 and L2P2 92 of the network element ports 70, 74 associated with the identified replacement link 66 that can be used to restore the traffic.

In step 168 the restoration manager (RM) 136 identifies the services affected by the faulty link. This may be done for an Ethernet service, for example by obtaining the Virtual Local Area Network IDs (VLAN IDs) configured on the network element port for which an alarm has been received.

In the exemplary embodiment the services association 112a for the port managed object L1P1 84 and the services association 112b for the port managed object L1P2 88 can be read to identify the service.

The Ethernet services configuration manager (ESCM) 138 then reconfigures the relevant VLAN IDs from the ports associated with the faulty link to the ports associated with the replacement link specified in the link protection group (LPG).

In some embodiments, a reconfiguration message 142 may be sent from the Restoration manager (RM) 136 to the Ethernet services configuration manager (ESCM) 138 in response to which the Ethernet services configuration manager (ESCM) 138 reconfigures the identified services for the second inter-domain link L2 instead of the faulty first inter-domain link L1. In other embodiments, the necessary transition from the Restoration manager (RM) 136 to the Ethernet services configuration manager (ESCM) 138 may be achieved without the use of an explicit message.

For example in embodiments where the Restoration manager (RM) 136 and the Ethernet services configuration manager (ESCM) 138 are implemented as modules of a software program, the necessary transition from the Restoration manager (RM) 136 to the Ethernet services configuration manager (ESCM) 138 may be achieved by the interaction between the different software modules without the use of an explicit message.

In step 170 the Ethernet services configuration manager (ESCM) 138 removes the service configuration from the ports involved in the faulty first inter-domain link 66.

In the exemplary embodiment, the Ethernet services configuration manager (ESCM) 138 updates the services association 112a for the port managed object L1P1 84 and the services association 112b for the port managed object L1P2 88 to remove the configuration of the service on the ports of the first inter-domain link 64, for example by removing the association with the respective virtual local area network ID (VLAN ID).

In step 172 the Ethernet services configuration manager (ESCM) 138 adds the service configuration to the ports involved in the link protection group (LPG) the second inter-domain link 66.

In the exemplary embodiment, the Ethernet services configuration manager (ESCM) 138 updates the services association 112c for the port managed object L2P1 90 and the services association 112d for the port managed object L2P2 92 to add the configuration of the service on the ports of the second inter-domain link 66, for example by adding the association with the respective virtual local area network ID (VLAN ID).

Thereafter the Ethernet traffic is restored through the replacement link specified in the link protection group for the faulty link, and the fault handling method exits to fault handling end stage 154. As will be appreciated from the description above, in the exemplary embodiment, the inter-domain service is re-configured from the faulty first inter-domain link 64 to the second inter-domain link 66 using the link protection group information 78 for the link protection group 36 for the first and second inter-domain links 64, 66.

In some embodiments, the links forming the link protection group (LPG) may be viewed merely as alternate inter-domain links that may be used by the Ethernet service traffic. In embodiments where there is no real preference for one of the links to be selected as the primary link and another link to be designated as a secondary link, if a fault recovery method such as that described above is used to switch Ethernet service traffic from a first faulty link to a replacement link within a link protection group (LPG), the operation system support (OSS) 8 may not switch the Ethernet traffic back to the original link once the fault is corrected.

From the above it can be seen that embodiments of the invention provide a novel method and apparatus for fault management for an inter-domain link carrying an inter-domain service, such as an Ethernet traffic service.

As indicated above, when the link protection group (LPG) is created or configured in the exemplary embodiment, a group of managed objects are created and stored as link protection group information 78 in the OSS database 10. For each link protection group (LPG) a group of managed objects corresponding to the managed objects specified in the logical model of the link protection group (LPG) as described above with reference to FIG. 3 are created or selected and associated with each other. An exemplary method for link protection group managed object creation and association will now be explained with reference to FIG. 8.

In step 174, in response to an instruction to create a link protection group (LPG), the link protection group configuration manager (LPGCM) 132 of the operation system support OSS 8 creates a link protection group managed object LPG1 80 in the OSS database 10.

In step 175, the link protection group configuration manager (LPGCM) 132 creates a first link managed object L1 82 in the OSS database 10.

In step 176, the link protection group configuration manager (LPGCM) 132 receives information identifying the first port for the first link of the link protection group being set up, for example the first link first port co-ordinates may be received. In response, the link protection group configuration manager (LPGCM) 132 identifies a first link first port managed object L1P1 84 in the OSS database 10 creates an association between the first link first port managed object L1P1 84 and the first link managed object L1 82.

In step 177 the link protection group configuration manager (LPGCM) 132 receives information identifying the second port for the first link of the link protection group being set up, for example the first link second port co-ordinates may be received. In response, the link protection group configuration manager (LPGCM) 132 identifies a first link second port managed object L1P2 86 in the OSS database 10 creates an association between the first link second port managed object L1P2 86 and the first link managed object L1 82.

As an alternative to steps 175-177, if the first link managed object L1 82 already exists in the OSS database 10, the first link managed object L1 82 may simply be selected in step 178.

In step 179 the link protection group configuration manager (LPGCM) 132 associates the first link managed object L1 82 with the link protection group managed object LPG1 80.

In step 180 the link protection group configuration manager (LPGCM) 132 creates a second link managed object L2 88 in the OSS database 10.

In step 182 the link protection group configuration manager (LPGCM) 132 receives information identifying the first port for the second link of the link protection group being set up, for example the second link first port co-ordinates may be received. In response, the link protection group configuration manager (LPGCM) 132 identifies a second link first port managed object L2P1 90 in the OSS database 10 creates an association between the second link first port managed object L2P1 90 and the second link managed object L2 88.

In step 183 the link protection group configuration manager (LPGCM) 132 receives information identifying the second port for the second link of the link protection group being set up, for example the second link second port co-ordinates may be received. In response, the link protection group configuration manager (LPGCM) 132 identifies a second link second port managed object L2P2 92 in the OSS database 10 creates an association between the second link second port managed object L2P2 92 and the second link managed object L2 88.

In step 184 the link protection group configuration manager (LPGCM) 132 associates the second link managed object with the link protection group managed object.

In the above description, it is assumed that the port managed objects are already available in the OSS database 10. If the port managed object is not available in the OSS database 10, the link protection group configuration manager (LPGCM) 132 may create a respective port managed object in the OSS database.

In other embodiments it may be possible for the operation system support 8 to create a link protection group managed object in the OSS database 10 and then to select link managed objects to associate with the link protection group managed object. In the exemplary embodiment described above with reference to FIG. 6, this action is performed by the link protection group configuration manager (LPGCM) 132.

In some embodiments the operator selects the links to be used in a link protection group.

In some embodiments, links that are already included in a link protection group are not considered for use during the formation of a new link protection group.

Again, it is important to note that the link protection group is created only at the OSS database 10 and the network elements are not required to be aware of the existence or configuration of the link protection group.

The link protection groups (LPGs) may be created and configured, for example in accordance with the exemplary embodiment described above with reference to FIG. 8 if they are identified by a network operator. In this case, the creation and configuration of the link protection groups (LPG) may be initiated by an operator independently of an inter-domain Ethernet service creation.

Alternatively, in the course of creating an inter-domain Ethernet service it may be necessary to create and configure a link protection group (LPG) if no suitable link protection group (LPG) already exists.

Multi-domain Ethernet service routing and activation is carried out by the operation system support (OSS) 8. An exemplary method of multi-domain Ethernet service inter-domain link configuration using link protection groups will now be described with reference to FIG. 9.

As described above and as will be known by a skilled person during a routing operation for an inter-domain Ethernet service, the operation system support OSS 8 identifies network ports on which to configure the virtual local area network identification (VLAN ID) relating to the Ethernet service being set up.

Figure 9:
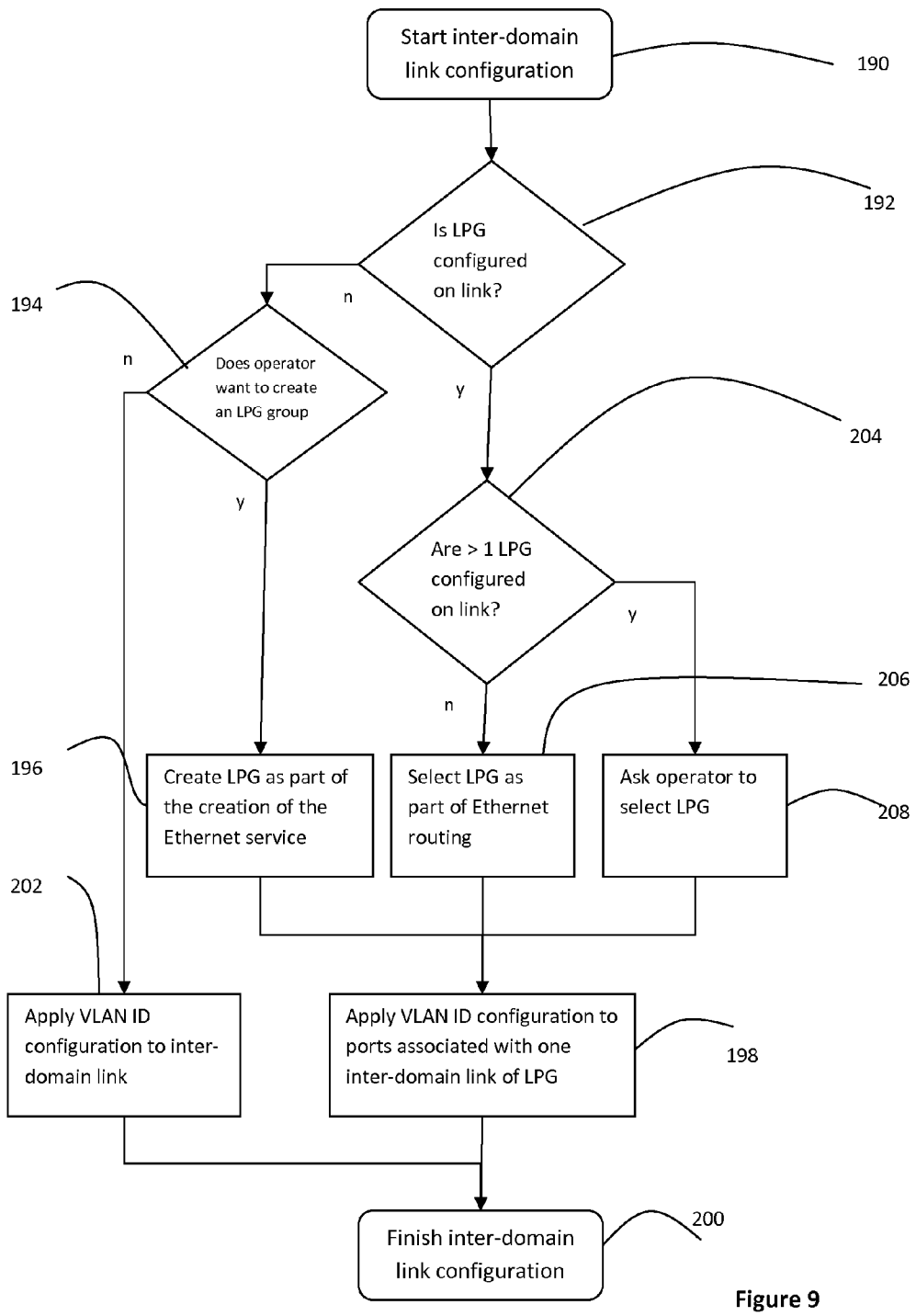
FIG. 9 is a flowchart showing a method of configuring an inter-domain Ethernet service with a link protection group.

When the routing operation reaches an inter-domain link, link protection groups (LPGs) are taken into consideration by the operation system support OSS 8 in an inter-domain link configuration method in accordance with embodiments as shown starting in step 190 of FIG. 9.

In step 192 it is determined whether there is a link protection group (LPG) configured on the inter-domain link in question. This can be achieved by searching the OSS database 10 for the link managed object corresponding to the inter-domain link.

If no link protection group (LPG) exists, step 192-*n*, in step 194 of the exemplary embodiment the operation system support 8 provides the operator with an opportunity to create a link protection group.

If the operator wants to create a link protection group (LPG), step 194-*y*, then in step 196 the link protection group is created, for example in accordance with the method as described above with reference to FIG. 8, as part of the creation of the Ethernet service.

Once the link protection group has been created in step 196, the virtual local area network identification (VLAN ID) configuration is applied to the port managed objects of ports associated with one inter-domain link of the link protection group in step 198.

If the operator does not want to create a link protection group (LPG), step 194-*n*, then a link protection group is not used for the inter-domain link. Therefore, in step 202, the virtual local area network identification (VLAN ID) configuration is applied to the port managed objects of ports associated with the inter-domain link, and the inter-domain link configuration ends in step 200.

If it is determined in step 192-*y* that a link protection group for the inter-domain link is already set up, it is determined in step 204 whether there are more than one link protection group for an inter-domain link already configured.

If only a single inter-domain link protection group is set up, step 204-*n*, the link protection group is selected as part of the Ethernet routing in step 206 and the virtual local area network identification (VLAN ID) configuration is applied to the port managed objects of ports associated with one inter-domain link of the link protection group in step 198, and the inter-domain link configuration ends step 200.

If more than one inter-domain link protection group exists, step 204-*y*, it must be determined which link protection group is to be used to protect the inter-domain link. Therefore, in the exemplary embodiment in step 208 the operator is asked to select the operable link protection group. In other embodiments the selection may be made automatically or semi-automatically by the operation system support (OSS) 8, for example based on other routing factors.

Once the link protection group has been selected in step 208, the virtual local area network identification (VLAN ID) configuration is applied to the port managed objects of ports associated with one inter-domain link of the link protection group in step 198, and the inter-domain link configuration ends step 200.

Once the Ethernet service has been routed in accordance with the above method, it is necessary to activate the Ethernet service on the relevant ports of the network elements. The operation system support OSS 8 accesses the managed objects in the OSS database 10 to determine the ports on which the virtual local area network configuration (VLAN ID) should be configured. These ports will be ports that could be involved in the service routing by the loop prevention protocols while recalculating the active topologies (MSTP, RSTP and ERP) within a domain, and also will be the ports associated with the selected primary link of the link protection group.

Finally, the operation system support OSS 8 sends the virtual local area network configuration (VLAN ID) to the relevant network elements to activate the Ethernet service.

From the above it can be seen that embodiments of the invention provide a novel method and apparatus for fault management for an inter-domain link carrying inter-domain service traffic such as Ethernet service traffic.

Embodiments of the invention provide improvement of the Carrier Ethernet OAM capabilities through the operation system support OSS by minimizing network downtime on inter-domain links owing to critical faults. This may result in significant operating expenditure (OPEX) savings for network operators.

In addition no network element (NE) upgrades are required to implement embodiments of the invention since the operation system support (OSS) performs inter-domain protection. In addition the use of VLAN ID reconfiguration for inter-domain Ethernet service re-configurations avoids protocol re-convergence in rapid spanning tree protocol (RSTP) and multiple spanning tree protocol (MSTP) networks.

The invention claimed is:

1. A fault protection method for an inter-domain link between network element ports in different domains of a multi-domain network, using link protection group information relating to at least a first link protection group, comprising a first inter-domain link between respective network element ports configured for an inter-domain service and a second inter-domain link between respective network element ports, the fault protection method comprising the steps of:
   creating link protection group information by:
      creating a link protection group information entity,
      associating a first link information entity relating to a first inter-domain link with the link protection group information entity,
      associating a second link information entity relating to a second inter domain link with the link protection group information entity,
      creating a first link second port information entity relating to a second network element port for the first inter-domain link and associating the first link second port information entity with the first link information entity, and
      creating a second link second port information entity relating to a second network element port for the second inter-domain link and associating the second link second port information entity with the second link information entity;
   determining a fault in the first inter-domain link;
   identifying the second inter-domain link from the link protection group information; and
   reconfiguring routing of the inter-domain service by removing a Virtual Local Area Network identification (VLAN ID) from the respective network element ports of the first inter-domain link and applying the VLAN ID to the respective network element ports of the identified second inter-domain link.

2. The fault protection method as claimed in claim 1, further comprising at least one of the steps of:
   selecting the first link information entity relating to the first inter-domain link from an operation system support (OSS) storage; and
   creating a second link information entity relating to the second inter-domain link from the OSS storage.

3. The fault protection method as claimed in claim 1, further comprising the step of:

creating the first link information entity; and
creating a first link first port information entity relating to the first network element port for the first inter-domain link, and associating the first link first port information entity with the first link information entity.

4. The method as claimed in claim 3, further comprising the step of associating inter-domain service configuration information for an inter-domain service with port information entities corresponding to the network element ports on which the inter-domain service is configured.

5. The method as claimed in claim 4, further comprising the step of updating the association between the inter-domain service configuration information and the port information entities to reflect the re-configuration of the routing of the inter-domain service.

6. The method as claimed in claim 1, further comprising the steps of:
creating the second link information entity; and,
creating a second link first port information entity relating to the first network element port for the second inter-domain link, and associating the second link first port information entity with the second link information entity.

7. The method as claimed in claim 1, wherein the link protection group information entities are managed objects in an operation system support (OSS) database.

8. The method as claimed in claim 1, wherein the inter-domain service is an inter-domain Ethernet service.

9. A fault protection method for an inter-domain link between network element ports in different domains of a multi-domain network, using link protection group information relating to at least a first link protection group, comprising a first inter-domain link between respective network element ports configured for an inter-domain service and a second inter-domain link between respective network element ports, the fault protection method comprising the steps of:
determining a fault in the first inter-domain link, wherein the step of determining an inter-domain fault in the first inter-domain link further comprises the steps of:
receiving an alarm for a network element port;
identifying the port information entity for the network element port;
identifying a link information entity for the link associated with the port information entity;
determining from the port information entity services configured on the inter-domain link; and
determining from the port information entity whether the link is an inter-domain boundary link, wherein
an inter-domain fault is determined when an alarm is received for a network element of a port of an inter-domain link configured for an inter-domain service;
identifying the second inter-domain link from the link protection group information; and
reconfiguring routing of the inter-domain service by removing a Virtual Local Area Network identification (VLAN ID) from the respective network element ports of the first inter-domain link and applying the VLAN ID to the respective network element ports of the identified second inter-domain link.

10. The method as claimed in claim 9, wherein the step of identifying the second inter-domain link from the link protection group information further comprises the steps of:
identifying link protection group information entity associated with the link information entity for the faulty inter-domain link;
determining a link information entity associated with the link protection group information entity whether a second inter-domain link is available;
identifying from the link information entity for the replacement link the associated port information entity for network element ports of the identified second inter-domain link; and
identifying from the identified port information entities of the faulty inter-domain link the service identities of services affected by the faulty inter-domain link.

11. The method as claimed in claim 1, wherein the step of reconfiguring routing of the inter-domain service from the respective network element ports of the first inter-domain link to the respective network element ports of the identified replacement link further comprises the steps of:
removing service identities associated with port information entities of the network element ports of the faulty link; and
adding service identities associated with port information entities of the network element ports of identified replacement link.

12. A non-transitory machine-readable medium comprising instructions which when executed by a processor cause the processor to perform a method of fault protection for an inter-domain link between network element ports in different domains of a multi-domain network, using link protection group information relating to at least a first link protection group comprising a first inter-domain link between respective network element ports configured for an inter-domain service and a second inter-domain link between respective network element ports, the fault protection method comprising the steps of:
creating link protection group information by:
creating a link protection group information entity,
associating a first link information entity relating to a first inter-domain link with the link protection group information entity,
associating a second link information entity relating to a second inter domain link with the link protection group information entity,
creating a first link second port information entity relating to a second network element port for the first inter-domain link and associating the first link second port information entity with the first link information entity, and
creating a second link second port information entity relating to a second network element port for the second inter-domain link and associating the second link second port information entity with the second link information entity;
determining a fault in the first inter-domain link;
identifying the second inter-domain link from the link protection group information; and
reconfiguring routing of the inter-domain service by removing a Virtual Local Area Network identification (VLAN ID) from the respective network element ports of the first inter-domain link and applying the VLAN ID to the respective network element ports of the identified second inter-domain link.

13. An apparatus providing fault protection for inter-domain links between network element ports in different domains of a multi-domain network, the apparatus comprising a processor and a non-transitory memory coupled to the processor, wherein the processor is configured to implement a plurality of modules comprising:
a store for storing link protection group information relating to at least a first link protection group comprising a first inter-domain link between respective network element ports configured for an inter-domain service and a second inter-domain link between respective network element ports, wherein the link protection group information comprises:
- a first link information entity relating to the first inter-domain link;
- a second link information entity relating to the second inter-domain link;
- a link protection group information entity associated with each of the first link information entity and the second link information entity;
- a first link second port information entity relating to a second network element port for the first inter-domain link associated with the first link information entity; and
- a second link second port information entity relating to a second network element port for the second inter-domain link associated with the second link information entity;

a fault manager, coupled to receive fault reports and operable to determine a fault in the first inter-domain link;

a restoration manager, coupled to the fault manager to receive a notification of a fault for the first inter-domain link and coupled to the store to access the link protection group information associated with the first inter-domain link, the restoration manager being operable to identify a second inter-domain link from the link protection group information; and a service configuration manager coupled to the restoration manager to receive notification of an inter-domain service routing configuration change and operable to reconfigure routing of the inter-domain service by removing a Virtual Local Area Network identification (VLAN ID) from the respective network element ports of the first inter-domain link and applying the VLAN ID to the respective network element ports of the identified second inter-domain link.

14. The apparatus as claimed in claim 13, further comprising a link protection group configuration manager arranged to access the storage and to create link protection group information therein.

15. The apparatus as claimed in claim 13, wherein the link protection group information comprises:
- a first link first port information entity relating to a first network element port for the first inter-domain link associated with the first link information entity.

16. The apparatus as claimed in claim 13, wherein the link protection group information comprises:
- a second link first port information entity relating to a first network element port for the second inter-domain link associated with the second link information entity.

17. The apparatus as claimed in claim 13, wherein the store is an operation system support database.

18. The apparatus as claimed in claim 13, wherein the inter-domain service is an inter-domain Ethernet service.

19. The apparatus of claim 13, wherein the apparatus is a component of an Operation system support.

* * * * *